(12) United States Patent
Okada et al.

(10) Patent No.: US 7,549,829 B2
(45) Date of Patent: Jun. 23, 2009

(54) CLIP

(75) Inventors: Shigeo Okada, Kanagawa (JP); Takeshi Kuroda, Kanagawa (JP)

(73) Assignee: Piolax Inc., Yokohama-shi, Kanagawa-ken (JP)

( * ) Notice: Subject to any disclaimer, the term of this patent is extended or adjusted under 35 U.S.C. 154(b) by 0 days.

(21) Appl. No.: 11/117,427

(22) Filed: Apr. 29, 2005

(65) Prior Publication Data

US 2005/0244250 A1 Nov. 3, 2005

(30) Foreign Application Priority Data

Apr. 30, 2004 (JP) ............................. 2004-135281

(51) Int. Cl.
*F16B 19/00* (2006.01)
*F16B 15/00* (2006.01)

(52) U.S. Cl. .................... 411/508; 411/451.1; 411/509; 411/510; 24/453

(58) Field of Classification Search .............. 411/451.1, 411/452, 455, 456, 451.3, 451.4, 451.5, 508, 411/509, 510, 512, 913; 24/453, 297
See application file for complete search history.

(56) References Cited

U.S. PATENT DOCUMENTS

| | | | | | |
|---|---|---|---|---|---|
| 4,261,243 | A | * | 4/1981 | Palmer | 411/510 |
| 4,396,329 | A | * | 8/1983 | Wollar | 411/508 |
| 4,637,768 | A | * | 1/1987 | Rabe | 411/452 |
| 4,846,655 | A | * | 7/1989 | Gulley | 411/453 |
| 5,192,169 | A | * | 3/1993 | Landsberg | 405/259.1 |
| 5,373,611 | A | * | 12/1994 | Murata | 24/297 |
| 5,573,362 | A | * | 11/1996 | Asami et al. | 411/509 |
| 6,039,523 | A | * | 3/2000 | Kraus | 411/48 |
| 6,193,456 | B1 | * | 2/2001 | Stumpf et al. | 411/180 |
| 6,305,055 | B1 | * | 10/2001 | Castro | 24/458 |
| 6,349,514 | B1 | * | 2/2002 | Adams | 52/155 |
| D456,699 | S | * | 5/2002 | Nakanishi | D8/382 |

(Continued)

FOREIGN PATENT DOCUMENTS

JP 2571374 2/1998

(Continued)

OTHER PUBLICATIONS

United Kingdom Search Report dated Jun. 10, 2005.

*Primary Examiner*—Victor Batson
*Assistant Examiner*—David C Reese
(74) *Attorney, Agent, or Firm*—McGinn IP Law Group, PLLC

(57) ABSTRACT

A clip has a head part adapted to be contacted with a peripheral edge of a fitting hole in a panel to be fitted, and a leg part adapted to be inserted into the fitting hole thereby to be engaged with the peripheral edge of the fitting hole. The leg part has a post suspended from a center of a lower face of the head part, at least three projections which are radially extended from the post in a diametrical direction and connected to the lower face of the head part at their upper ends, and engaging pieces which are extended from these projections in a circumferential direction to be respectively positioned between the projections. The engaging pieces are connected to the head part at their upper ends, and provided with slits between their circumferentially extended ends and the opposed projections.

19 Claims, 5 Drawing Sheets

U.S. PATENT DOCUMENTS

| | | | |
|---|---|---|---|
| 6,572,317 B2* | 6/2003 | Okada et al. | 411/508 |
| 6,974,292 B2* | 12/2005 | Hansen | 411/508 |
| 2002/0028123 A1* | 3/2002 | Miura et al. | 411/508 |
| 2002/0037206 A1* | 3/2002 | Okada et al. | 411/508 |
| 2002/0106261 A1* | 8/2002 | Nakanishi | 411/508 |
| 2004/0052612 A1* | 3/2004 | Miura | 411/508 |
| 2004/0057812 A1* | 3/2004 | Schaty | 411/508 |
| 2004/0136811 A1* | 7/2004 | Tarlton | 411/451.4 |
| 2005/0214069 A1* | 9/2005 | Perez et al. | 403/408.1 |

FOREIGN PATENT DOCUMENTS

| | | |
|---|---|---|
| JP | 3450342 | 7/2003 |

* cited by examiner

CLIP

BACKGROUND OF THE INVENTION

1. Field of the Invention

The present invention relates to a clip formed of resin which is utilized for fixing, for example, components to be incorporated inside an automobile or an electric appliance, to a panel part of a vehicle body or a body of the electric appliance, or for fixing another panel to this panel part.

2. Description of the Related Art

Generally, the clip of this type has a head part adapted to be contacted with a peripheral edge of a fitting hole in a panel to be fitted, and a leg part which is extended from the head part and adapted to be inserted into the fitting hole thereby to be engaged with the peripheral edge of the fitting hole at a back side thereof.

As an example of such clip, Japanese Utility Model Registration No. 2571374 as described below discloses a clip formed of resin and including a head part adapted to be attached to an object for mounting (for example a door trim of an automobile), a leg part adapted to be inserted into a fitting hole in a vehicle body, wherein the leg part has a post suspended from a center part of a lower face of the head part, and at least three skeleton pieces radially protruded from the post along a vertical direction of the post, having such a protruding width that the skeleton pieces can be inserted into the fitting hole with substantially no clearance, and elastic engaging pieces allowable to be inwardly flexed are extended from distal ends of the skeleton pieces in a circumferential direction of a circle which is drawn around the post making the skeleton pieces as a radius, engaging edges which can be engaged with the edge of the fitting hole being formed on an outer peripheral face of the elastic engaging pieces at positions adjacent to their free ends, the elastic engaging pieces being further provided with connecting portions to the skeleton pieces in the vertical direction of the skeleton pieces, lower edges of the circumferentially extended portions of the elastic engaging pieces being formed as free ends along their entire length.

On the other hand, Japanese Patent No. 3450342 discloses a clipping device formed of synthetic resin and including a head part, and a locking leg which is suspended from a lower face of the head part and adapted to be inserted into a through hole in a panel thereby to be fixed to the panel, wherein the locking leg is straightly suspended from a center part of the lower face of the head part, and provided with four projections which are radially projected outwardly from its center in a longitudinal direction of the locking leg, the clip further includes a shaft core part making a substantial outer diameter of a circle connecting respective distal ends of the four projections smaller than a diameter of the through hole in the panel, and four elastic locking pieces arranged between the four projections of the shaft core part at determined intervals from the respective projections, with their upper ends joined to a base part of the shaft core part or the lower face of the head part, and with their lower ends joined to a leg end of the shaft core part to be integral with the shaft core part, characterized in that the four elastic locking pieces are respectively formed with swelled parts on their outside faces in the middle of their length, a substantial diameter of a circle connecting the swelled parts is made larger than the diameter of the through hole in the panel, whereby on occasion of reducing the diameter while the elastic locking pieces pass the through hole, the elastic locking pieces are retracted into the spaces between the projections and flexed toward the center part to be reduced in diameter, whereas on occasion of locking, the elastic locking pieces are protruded from the spaces between the projections by elastic restoring force, thereby to hook and lock the swelled parts on an edge of the through hole in the panel.

In case where a door trim of an automobile, for example, is fixed to a body panel, a clip is fitted to the door trim in advance, by engaging a head part of the clip with the door trim, and thereafter, a leg part of the clip is inserted and fixed into a fitting hole in the body panel while grasping the door trim by hand. However, the leg part of the clip is likely to be displaced from the fitting hole due to assembling variations when the vehicle has been assembled, and a position of the fitting hole cannot be easily confirmed by a worker, after the body panel has been covered with the door trim. For this reason, it has sometimes happened that the leg part cannot be straightly inserted into the fitting hole, but may be inclined with respect to the fitting hole when inserted. Moreover, there has been such a trouble that a prying force (a pulling force in a diagonal direction) may be exerted on the clip, even after the door trim and the body panel have been assembled together, due to variations or distortions in molding them.

When the leg part has been diagonally inserted, or the prying force has been applied to the clip in this manner, it has sometimes happened that a particular one of the elastic engaging pieces is excessively flexed, and exceeds a limit of elasticity of the elastic engaging piece, resulting in collapse or break of the particular elastic engaging piece. Consequently, it has sometimes happened that a sufficient locking force with respect to the fitting hole cannot be obtained, and the clip may cause a backlash or may be disengaged.

As a countermeasure, in the clip in the above described Japanese Utility Model Registration No. 2571374, an amount of flexure of the engaging pieces can be restricted to some extent when they have been diagonally inserted, because the at least three skeleton pieces are protruded from the post in a radial direction. However, in this clip, the ends of the engaging pieces extended from the distal ends of the skeleton pieces in a circumferential direction of the circle which is drawn around the post making the skeleton pieces as the radius are formed as the free ends which are not coupled to the skeleton pieces or the head part. Accordingly, there has been such probability that in case where a local pressure has been applied to the engaging pieces when they have been diagonally inserted, a particular engaging piece may be excessively flexed to cause plastic deformation, and engaging ability may be deteriorated.

On the other hand, in the clip in the above described Japanese Patent No. 3450342, an amount of flexure of the elastic locking pieces can be restricted to some extent when they have been diagonally inserted, because the shaft core part is provided with the four projections which are projected radially. However, because the clip includes the four projections which are projected radially, and the four elastic locking pieces which are arranged with gaps with respect to these projections, the connecting portions between the distal ends of the elastic locking pieces and the shaft core part are made rather thinner. Accordingly, there has been such a problem that the connecting portions may be likely to be broken.

SUMMARY OF THE INVENTION

An object of the invention is to provide a clip in which collapse or break of engaging pieces is unlikely to occur, even though a leg part of the clip has been diagonally inserted into a fitting hole or a prying force has been applied to the clip, and more stabilized locking force can be obtained.

In order to attain the above described object, according to a first aspect of the invention, there is provided a clip formed of resin and including a head part adapted to be contacted with a peripheral edge of a fitting hole in a panel to be fitted, and a leg part extended from the head part and adapted to be inserted into the fitting hole thereby to be engaged with the peripheral edge of the fitting hole at a back side thereof, characterized in that the leg part includes a post which is suspended from a center of a lower face of the head part, at least three projections which are radially extended from the post in a diametrical direction and connected to a lower face of the head part at their upper ends, and engaging pieces which are extended from these projections in a circumferential direction to be respectively positioned between the projections, and connected to the head part at their upper ends, wherein determined slits are formed between circumferentially extended ends of the engaging pieces and the projections opposed thereto, and only lower ends of the engaging pieces are connected to the opposed projections, an outer diameter of an imaginary circle defined by the engaging pieces being made larger than an inner diameter of the fitting hole.

According to the above described invention, when the leg part has been inserted into the fitting hole in the panel to be fitted, the engaging pieces will be flexed toward the post, and will be elastically restored after they have passed through the fitting hole thereby to be engaged with the peripheral edge of the fitting hole at the back side thereof. As the results, the panel to be fitted can be clamped between the head part and the leg part, whereby the clip can be fixed to the panel to be fitted.

Moreover, the clip according to the invention has the at least three projections which are radially extended from the post in a diametrical direction and connected to the lower face of the head part at their upper ends. Therefore, even though the leg part has been diagonally inserted into the fitting hole or a prying force has been exerted on the clip, eccentricity of the leg part with respect to the fitting hole will be restricted within a determined range by means of the at least three projections, and the engaging pieces can be prevented from being excessively flexed, to be collapsed or broken. Further, because the at least three engaging pieces arranged between the respective projections are engaged with the peripheral edge of the fitting hole at the back side thereof, the clip will be unlikely to be inclined, even though the prying force has been exerted, and consequently, disengagement of the clip can be prevented.

Still further, the engaging pieces are connected to the head part at their upper ends, and the determined slits are formed between the circumferentially extended ends of the engaging pieces and the projections opposed thereto. Because the lower ends of the engaging pieces are connected to the opposed projections, and are not perfect free ends, the engaging pieces will be prevented from being collapsed or broken, even though they are pressed with the inner periphery of the fitting hole to receive an excessive flexing force. In addition, in a state engaged with the back face of the fitting hole, a stabilized locking force can be obtained, and a backlash of the fitting member and disengagement of the clip can be prevented.

According to a second aspect of the invention, there is provided a clip according to the first aspect of the invention, wherein lower ends of the projections are protruded longer than lower end edges of the engaging pieces, and gradually reduced in diameter in a downward direction to be formed in a taper shape.

According to the above described invention, when the leg part is inserted into the fitting hole, the lower ends of the projections which are reduced in diameter in a taper shape will enter into the fitting hole thereby to guide the insertion. Therefore, in case of fitting the door trim for example, the leg part of the clip can be easily inserted into the fitting hole in the body panel, even in case where the fitting hole is hidden behind the door trim and cannot be seen.

According to a third aspect of the invention, there is provided a clip according to the first or second aspect of the invention, wherein the imaginary circle of the engaging pieces in their lower parts is gradually reduced in diameter in a downward direction to form a taper face.

In the clip according to the invention, the lower end parts of the engaging pieces cannot be flexed inwardly, because they are connected to the projections at both base ends and distal ends thereof in an extending direction. However, because the lower parts of the engaging pieces are gradually reduced in diameter in a downward direction to form the taper face, and enlarged diameter parts of the engaging pieces in the upper parts thereof are engaged with the fitting hole, it will be possible to insert the engaging pieces into the fitting hole.

As described above, according to the invention, even though the leg part of the clip has been diagonally inserted into the fitting hole or the prying force has been exerted on the clip, collapse or break of the engaging pieces will be unlikely to occur. Accordingly, stabilized locking force can be obtained, and a backlash of the fitting member or disengagement of the clip can be prevented.

BRIEF DESCRIPTION OF THE DRAWINGS

These and other objects and advantages of this invention will become more fully apparent from the following detailed description taken with the accompanying drawings in which.

DETAILED DESCRIPTION OF THE PREFERRED EMBODIMENTS

FIGS. 1A to 7 show one embodiment of a clip according to the invention.

Figure 1A:
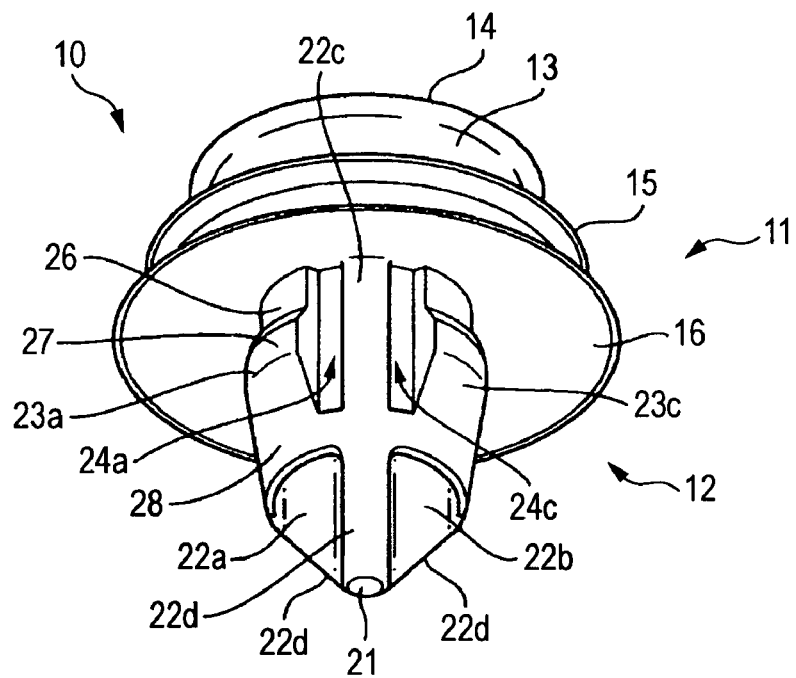
FIGS. 1A and 1B are perspective views of one embodiment of a clip according to the invention.
Figure 1B:
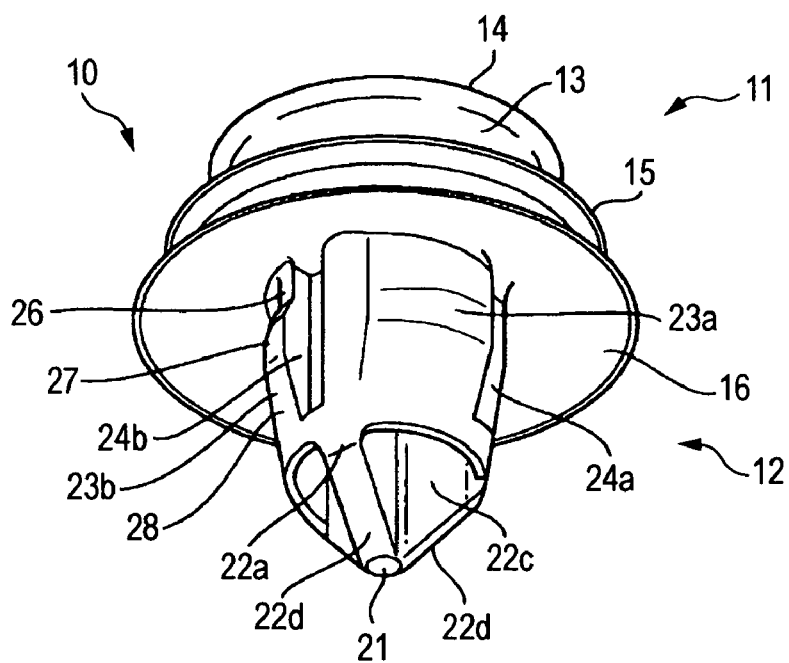
Figure 2:
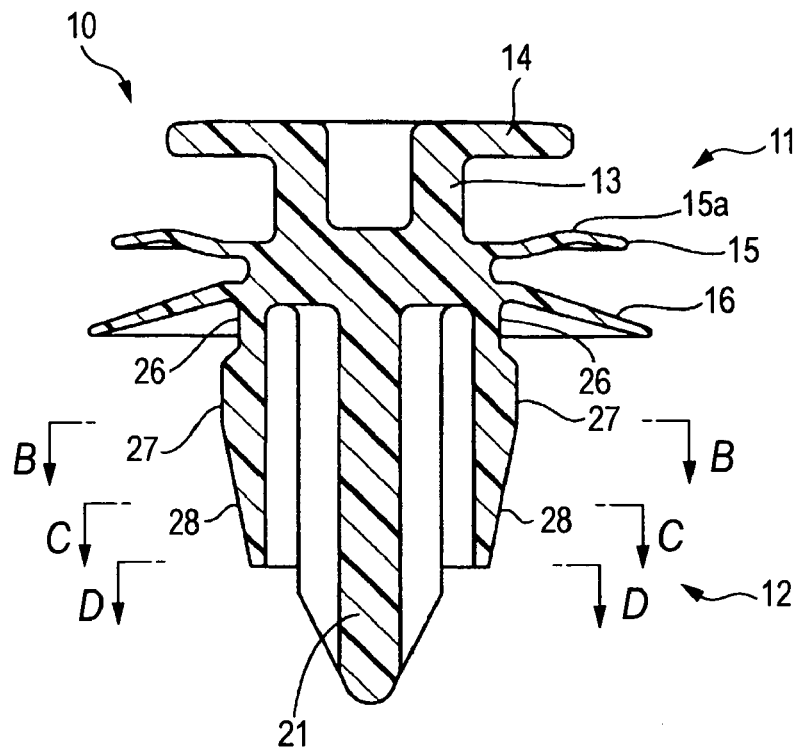
FIG. 2 is a vertical sectional view of the clip taken along an arrow mark line A-A in FIG. 4.

As shown in FIGS. 1A, 1B and 2, a clip 10 in this embodiment includes a head part 11 and a leg part 12. The head part 11 has a base portion 13 in a bottomed cylindrical shape, a first flange portion 14 which is formed on an outer periphery of this base portion 13 at an upper end thereof, a second flange portion 15 which is formed on the outer periphery of the base portion 13 in the middle part thereof, and a seal portion 16 which is formed on the outer periphery of the base portion 13 in a lower end part thereof.

Figure 7:
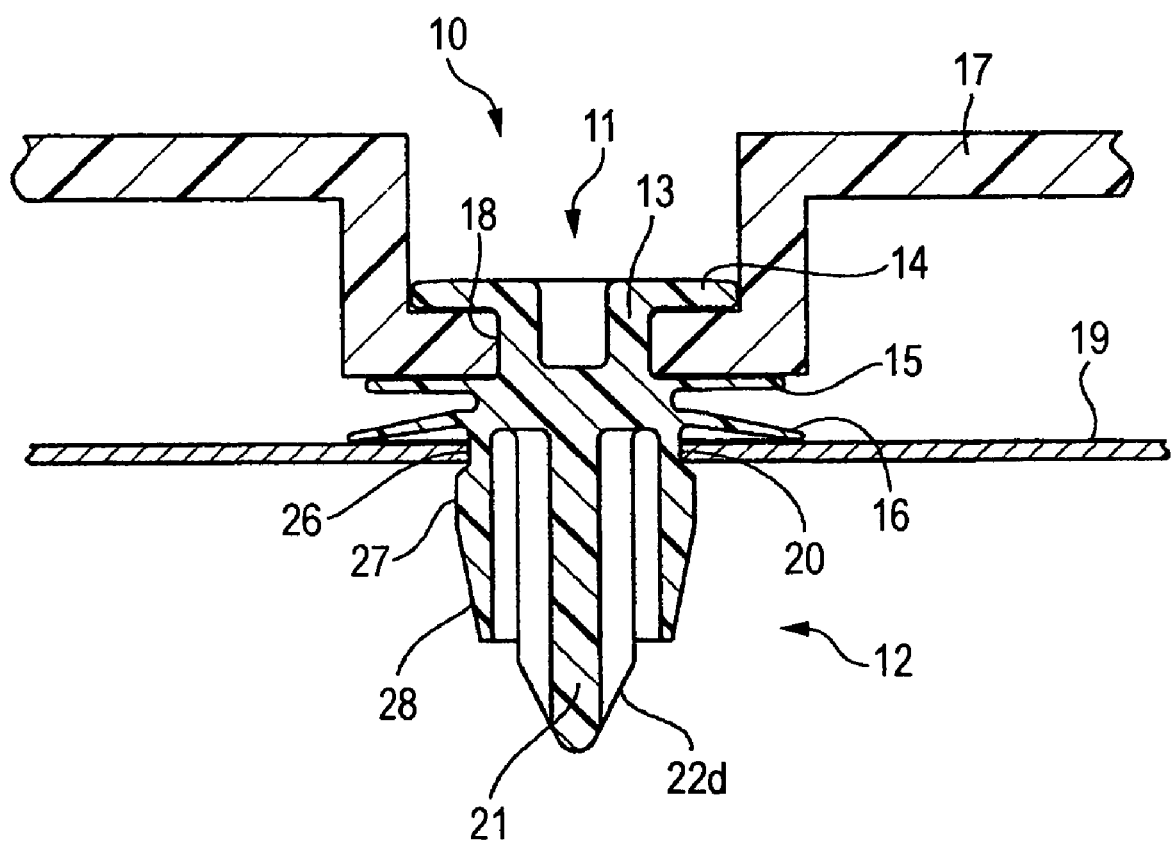
FIG. 7 is a sectional view showing a state where a fitting member has been fixed to a panel to be fitted, by means of the clip.

The second flange portion 15 has an annular protuberance 15a which is curved upwardly. As shown in FIG. 7, the second flange portion 15 is adapted to be engaged with an engaging groove 18 in a fitting member 17 to clamp a peripheral edge of the engaging groove 18 between the first flange portion 14 and the second flange portion 15, and thus, the clip is fixed to the fitting member 17 in advance.

A peripheral edge of the seal portion 16 is extended diagonally downwardly in a form of a skirt, and adapted to be contacted with an upper face of a panel 19 to be fitted thereby to seal a fitting hole 20. As the above mentioned fitting member 17, a door trim of an automobile, for example, may be named, and as the above mentioned panel 19 to be fitted, a body panel and so on may be named.

The leg part 12 has a post 21 which is suspended from a center part of a lower face of the head part 11. Three projections 22a, 22b, 22c are extended from the post 21 radially outwardly at regular intervals. These projections 22a, 22b, 22c extend in an axial direction of the post 21, with their upper ends connected to the lower face of the head part 11, and their lower ends 22d extended up to a lower end of the post 21 in a tapered shape which is gradually reduced in diameter.

From an outside edge of the projection 22b, there are formed two engaging pieces 23b and 23c in a circumferential direction around the post 21, so as to protrude in opposite directions to each other. Moreover, from an outside edge of the projection 22a toward the projection 22c, there is formed an engaging piece 23a in a circumferential direction around the post 21.

Between an extended end of the engaging piece 23a and the projection 22c opposed thereto, there is formed a slit 24a, between an extended end of the engaging piece 23b and the projection 22a opposed thereto, there is formed a slit 24b, and between an extended end of the engaging piece 23c and the projection 22c opposed thereto, there is formed a slit 24c. These slits 24a, 24b, 24c are not extended up to respective lower ends of the engaging pieces 23a, 23b, 23c, but the lower ends of the engaging pieces 23a, 23b, 23c are connected to the projections 22a, 22c opposed thereto. In other words, the slits 24a, 24b, 24c are formed so as to pass through middle parts of the engaging pieces 23a, 23b, 23c in a vertical direction.

The post 21, the projections 22a, 22b, 22c and the engaging pieces 23a, 23b, 23c define three spaces 25, each having a sector shape in cross section. In this manner, the engaging pieces 23a, 23b, 23c can be flexed inwardly because of presence of the slits 24a, 24b, 24c and the spaces 25.

An imaginary circle defined by the base parts 26 of the engaging pieces 23a, 23b, 23c close to the head part 11 has an outer diameter which is smaller than an inner diameter of the fitting hole 20 in the panel 19 to be fitted. Moreover, at a somewhat lower position than the base parts 26, there are formed enlarged diameter parts 27 whose imaginary circle has a larger outer diameter than the inner diameter of the aforesaid fitting hole 20. Further below the enlarged diameter parts 27, there are formed taper parts 28 whose imaginary circle is gradually reduced downwardly in diameter. The taper parts 28 are formed in such a manner that an outer diameter of their imaginary circle becomes smaller from its middle part than the inner diameter of the fitting hole 20 in the panel 19 to be fitted.

Figure 3:
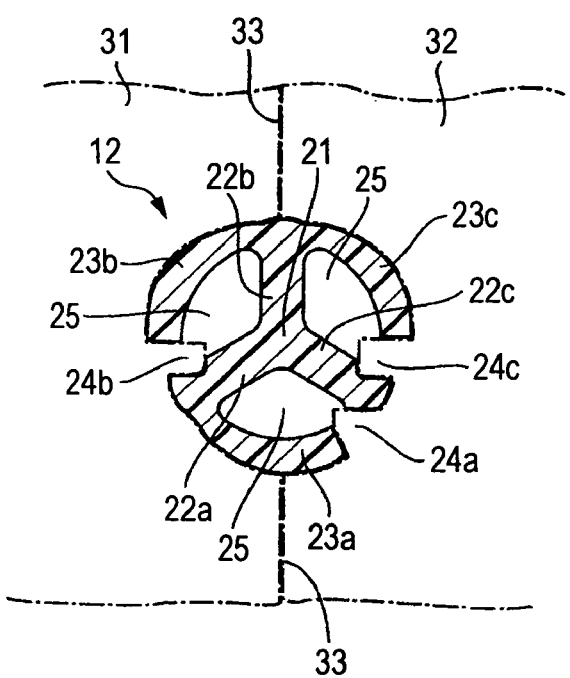
FIG. 3 is a cross sectional view of the clip taken along an arrow mark line B-B in FIG. 2.
Figure 4:
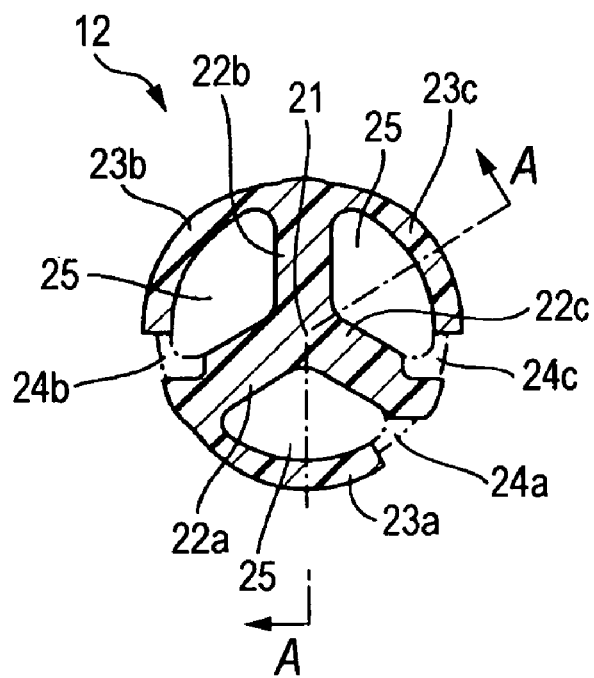
FIG. 4 is a cross sectional view of the clip taken along an arrow mark line C-C in FIG. 2.
Figure 5:
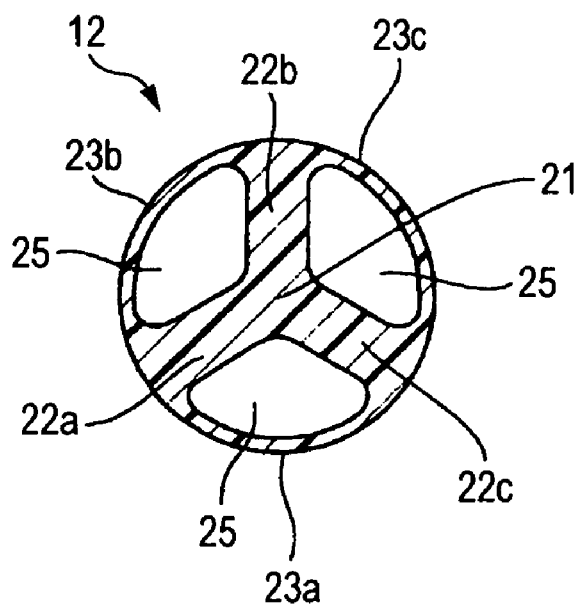
FIG. 5 is a cross sectional view of the clip taken along an arrow mark line D-D in FIG. 2.

FIG. 3 is a sectional view taken along an arrow mark line B-B in FIG. 2, showing a cross sectional plane taken at the enlarged diameter parts 27. FIG. 4 is a sectional view taken along an arrow mark line C-C in FIG. 2, showing a cross sectional plane taken in the middle of the taper parts 28. Further, FIG. 5 is a sectional view taken along an arrow mark line D-D in FIG. 2, showing a cross sectional plane taken at the lower ends of the engaging pieces 23a, 23b, 23c. As shown in FIG. 5, the engaging pieces 23a, 23b, 23c are connected by means of the projections 22a, 22b, 22c in a ring-like shape.

Figure 6A:
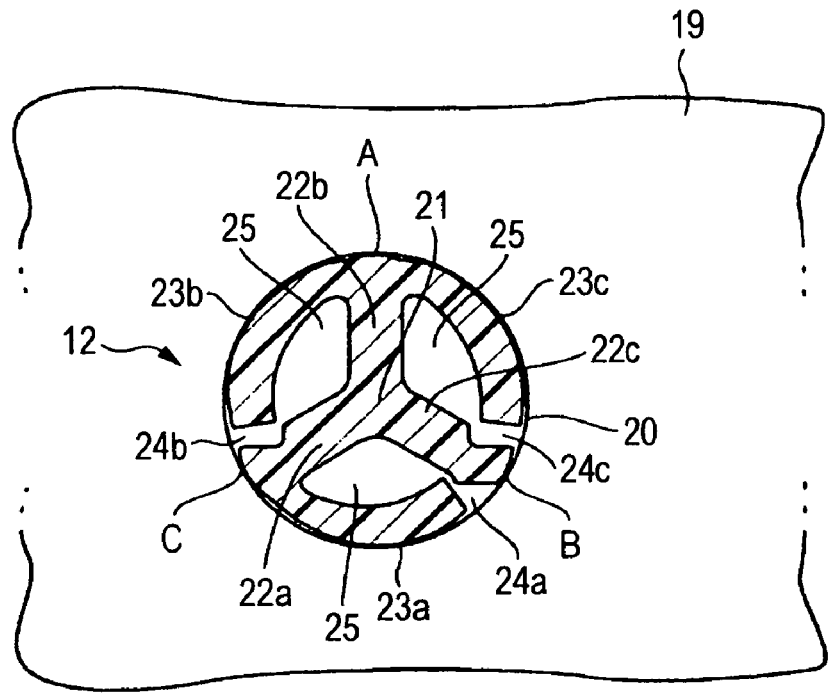
FIGS. 6A and 6B are explanatory views showing a state where a leg part of the clip is flexed, while the leg part is inserted into a fitting hole.
Figure 6B:
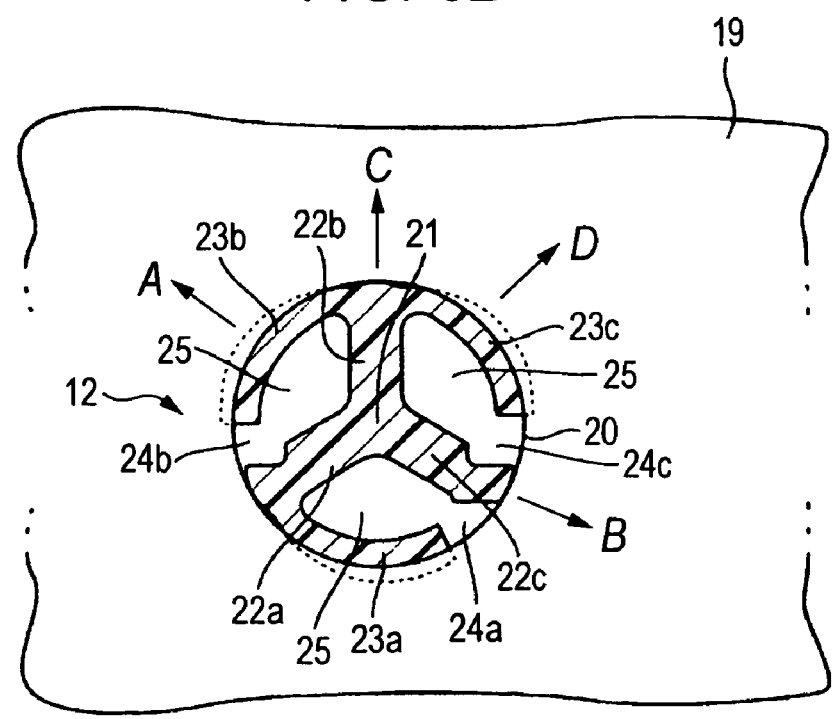

FIG. 6A shows a state where the enlarged diameter parts 27 are passing through the fitting hole 20. The engaging pieces 23a, 23b, 23c are flexed inwardly to enter into the spaces 25, so that the imaginary circle of the enlarged diameter parts 27 may have such outer diameter as capable of passing through the fitting hole 20. FIG. 6B shows a state after the enlarged diameter parts 27 have passed the fitting hole 20. The engaging pieces 23a, 23b, 23c are elastically restored, and the enlarged diameter parts 27 are expanded again thereby to be engaged with the fitting hole 20.

Now, operation of the clip 10 will be described.

As shown in FIG. 7, the base portion 13 located between the first flange portion 14 and the second flange portion 15 is inserted into the engaging groove 18 of the fitting member 17 which is a door trim of an automobile, for example. Then, by clamping the peripheral edge of the engaging groove 18 of the fitting member 17 between the first flange portion 14 and the second flange portion 15, the clip 10 can be mounted on the fitting member 17 in advance.

In this state, the leg part 12 of the clip 10 is inserted into the fitting hole 20 of the fitted panel 19 which is a body panel of a vehicle door, for example. On this occasion, the lower ends 22d in a tapered shape of the projections 22a, 22b, 22c will guide the insertion of the leg part 12 into the fitting hole 20, and the taper parts 28 of the engaging pieces 23a, 23b, 23c will be introduced into the fitting hole 20, following the lower ends 22d in a tapered shape.

As the engaging pieces 23a, 23b, 23c are inserted deep into the fitting hole 20 along the taper parts 28, the enlarged diameter parts 27 of the engaging pieces 23a, 23b, 23c come near the fitting hole 20. When the outer diameter of the engaging pieces 23a, 23b, 23c has become larger than the inner diameter of the fitting hole 20, the engaging pieces 23a, 23b, 23c will be flexed inwardly to enter into the spaces 25, so that the imaginary circle of the enlarged diameter parts 27 may have such outer diameter as capable of passing through the fitting hole 20.

On this occasion, the three projections 22a, 22b, 22c extended radially from the post 21 are kept in contact with the inner periphery of the fitting hole 20 at three contact points A, B, and C which are arranged at equal angles, as shown in FIG. 6A. Therefore, even in case where the leg part 12 has been diagonally inserted, the post 21 will be held at the center of the fitting hole 20 by means of the three contact points A, B, C, without being eccentrically positioned. As the results, it will not happen that loads may be concentrated on a particular one of the engaging pieces 23a, 23b, 23c so as to excessively flex the particular engaging piece.

Moreover, because the engaging pieces 23a, 23b, 23c are connected to the lower face of the head part 11 at their upper ends, and connected together in a ring-like shape at their lower ends, as shown in FIG. 5, their rigidity as a whole has been enhanced. For this reason, according to the clip 10, collapse of break of the engaging pieces 23a, 23b, 23c can be effectively prevented.

After the enlarged diameter parts 27 of the engaging pieces 23a, 23b, 23c have passed through the fitting hole 20, the enlarged diameter parts 27 will be elastically restored to have the larger diameter than the inner diameter of the fitting hole 20, whereby the leg part 12 will be engaged with the fitting hole 20 at the back side thereof. As the results, the peripheral edge of the fitting hole 20 in the fitted panel 19 will be clamped between the leg part 12 and the seal portion 16, as shown in FIG. 7, and the fitting member 17 will be fixed to the fitted panel 19 by means of the clip 10.

In this state, the seal portion 16 comes into tight contact with one face of the fitted panel 19, thereby to seal the fitting hole 20. Moreover, according to the clip 10, as shown by a phantom line in FIG. 3, a laterally sliding mold required for molding the leg part 12 can be composed of two molds 31, 32. Consequently, only two lines extending in a diametrical direction are formed on the lower face of the seal portion 16 at a junction plane 33 of the two molds 31, 32 as a molding line (a line formed at a junction between two molds), and the above described sealing performance can be favorably maintained.

Further, in a state fixed to the fitted panel 19 as shown in FIG. 7, the enlarged diameter parts 27 of the three engaging pieces 23a, 23b, 23c are engaged with the fitting hole 20 at the back side thereof, as shown in FIG. 6B. As the results, the clip 10 will be unlikely to be inclined, even though a prying force has been applied to the fitting member 17. In addition, because the engaging pieces 23a, 23b, 23c are connected to the head part 11 at their upper ends and connected to one another in a ring-like shape at their lower ends as shown in FIG. 5, their rigidity as a whole has been enhanced, and therefore, collapse of break of the engaging pieces 23a, 23b, 23c caused by the prying force as described above can be prevented.

Although in the above described embodiment, the three projections 22a, 22b, 22c are extended from the post 21 and the three engaging pieces 23a, 23b, 23c are extended again from these projections, it is to be noted that the number of the projections and the engaging pieces may be four or more, within a scope of the invention.

What is claimed is:

1. A clip that is formed of resin, comprising:
a head part for contacting a peripheral edge of a fitting hole; and
a leg part extended from the head part for insertion into the fitting hole thereby to be engaged with the peripheral edge of the fitting hole at a back side thereof, said leg part comprising:
a post which is suspended from a center of a lower face of said head part;
at least three projections which are radially extended from the post in a diametrical direction, upper ends of said projections being connected to the lower face of said head part; and
engaging pieces which extend from the projections in a circumferential direction to be respectively positioned between the projections, said engaging pieces comprising:
upper ends for connecting to the head part; and
lower ends for mutually connecting to each projection to form a complete ring such that spaces are defined by an inner portion of the complete ring, the projections, the post, and the lower face of said head part,
wherein said spaces have a shape of a circular sector,
wherein slits are formed by circumferentially extended ends of the engaging pieces and the projections opposed thereto, and
wherein an outer diameter of a circle defined by said engaging pieces is larger than an inner diameter of said fitting hole.

2. The clip according to claim 1, wherein lower ends of said projections protrude longer than lower end edges of said engaging pieces, and gradually reduce in diameter in a downward direction to form a tapered shape.

3. The clip according to claim 1, wherein said circle defined by said engaging pieces in their lower parts is gradually reduced in diameter in a downward direction to form a tapered face.

4. The clip of claim 1, wherein said at least three projections extend from said post at regular intervals.

5. The clip of claim 1, wherein two of said engaging pieces extend from the same one of said at least three projections.

6. The clip of claim 1, wherein said engaging pieces extend from radially-distal ends of said at least three projections.

7. The clip of claim 1, wherein the post, the projections and the engaging pieces define spaces, said engaging pieces being flexible inwardly because of the slits and the spaces.

8. A clip, comprising:
a head; and
a leg extending from the head,
wherein said leg comprises:
a post extending downwardly from said head;
at least three projections extending radially from said post; and
engaging pieces circumferentially extending from said at least three projections and connected at lower ends of the engaging pieces to opposing projections,
wherein slits are defined by said engaging pieces and projections opposing said engaging pieces, and
wherein said lower ends of said engaging pieces mutually connect to each projection to form a complete ring such that spaces are defined by an inner portion of the complete ring, the projections, the post, and the head, said spaces having a cross-sectional shape of a circular sector at a plane perpendicular to the post, the complete ring being formed at the plane.

9. The clip of claim 8, wherein said engaging pieces connect to the head at upper ends of the engaging pieces.

10. The clip of claim 8, wherein an outer diameter of an imaginary circle defined by said engaging pieces is larger than an inner diameter of a fitting hole.

11. The clip of claim 10, wherein said outer diameter of said imaginary circle gradually reduces to form a tapered shape.

12. The clip of claim 8, wherein said projections extend lower than said engaging pieces from said head.

13. The clip of claim 8, wherein said projections form a tapered shape at a lower end.

14. The clip of claim 8, wherein said at least three projections extend from said post at regular intervals.

15. The clip of claim 8, wherein two of said engaging pieces extend from the same one of said at least three projections.

16. The clip of claim 8, wherein said engaging pieces extend from radially-distal ends of said at least three projections.

17. The clip of claim 8, wherein the post, the projections and the engaging pieces define spaces, said engaging pieces are flexible inwardly because of the slits and the spaces.

18. A clip that is formed of resin, comprising:
a head part for contacting a peripheral edge of a fitting hole; and
a leg part extended from the head part for insertion into the fitting hole thereby to be engaged with the peripheral edge of the fining hole at a back side thereof, said leg part comprising:
a post which is suspended from a center of a lower face of said head part;
at least three projections which are radially extended from the post in a diametrical direction, upper ends of said projections being connected to the lower face of said head part; and engaging pieces which extend from the projections in a circumferential direction to be respectively positioned between the projections, said engaging pieces comprising:

upper ends for connecting to the head part; and lower ends for mutually connecting to each projection to form a complete ring such that spaces are defined by the projections, the engaging pieces, the post, and the lower face of said head part at a position where an inner portion of the complete ring is formed, wherein said spaces have a cross-sectional shape of a circular sector at a plane perpendicular to the post, the complete ring being formed at the plane, wherein slits are formed by circumferentially extended ends of the engaging pieces and the projections opposed thereto, along an extending direction of the leg part from the lower face of said head part to the complete ring, and wherein an outer diameter of a circle defined by said engaging pieces is larger than an inner diameter of said fitting hole.

19. A clip, comprising:

ahead; and a leg extending from the head, said leg comprising:

a post extending downwardly from said head;

at least three projections extending radially from said post; and engaging pieces circumferentially extending from said at least three projections and connected at lower ends of the engaging pieces to opposing projections, wherein slits are defined by said engaging pieces and projections opposing said engaging pieces, wherein said lower ends of said engaging pieces mutually connect to each projection to form a complete ring such that spaces are defined by the projections, the engaging pieces, the post, and the lower face of said head part at a position where an inner portion of the complete ring is formed, said spaces having a cross-sectional shape of a circular sector at a plane perpendicular to the post, the complete ring being formed at the plane, and wherein the slits are formed along an extending direction of the leg from a lower face of said head to the complete ring.

* * * * *